United States Patent [19]

Swogger

[11] 4,093,428
[45] June 6, 1978

[54] GAS/LIQUID SEPARATOR

[75] Inventor: Emery C. Swogger, Arlington, Tex.

[73] Assignee: The United States of America as represented by the Secretary of the Navy, Washington, D.C.

[21] Appl. No.: 786,909

[22] Filed: Apr. 12, 1977

[51] Int. Cl.² .......................................... B01D 19/00
[52] U.S. Cl. .......................................... 55/52; 55/182; 55/204
[58] Field of Search ................... 55/38, 41, 52, 182, 55/201, 203, 204, 206, 207

[56] References Cited

U.S. PATENT DOCUMENTS

| | | | |
|---|---|---|---|
| 1,734,507 | 11/1929 | Westling et al. | 55/203 |
| 2,016,641 | 10/1935 | Lincoln | 55/206 X |
| 2,983,331 | 5/1961 | Helsley, Jr. | 55/182 X |
| 3,130,022 | 4/1964 | Clark | 55/182 |
| 3,290,864 | 12/1966 | Harker et al. | 55/203 |
| 3,396,513 | 8/1968 | Humphreys | 55/201 |
| 3,421,622 | 1/1969 | Wurtmann | 55/41 X |

Primary Examiner—Charles N. Hart
Assistant Examiner—Robert H. Spitzer
Attorney, Agent, or Firm—R. S. Sciascia; L. I. Shrago; C. E. Vautrain, Jr.

[57] ABSTRACT

A gas/liquid separator for separating entrained gases such as air from liquid such as oil in hydraulic systems under extreme flight conditions is provided. High density liquid substantially devoid of gas bubbles is forced toward the perimeter of a liquid chamber through centrifugal force by imparting rotational velocity to incoming liquid, causing low density air-entrained liquid and large gas bubbles to collect in the center of the chamber. The high density liquid is discharged from an upper slot in the chamber while liquid with entrained gas bubbles is urged centrally upward into a second chamber where further separation occurs. Gas-free liquid from the upper chamber is collected and discharged centrally within opposed outlets communicating with the slot to provide a pumping action which augments liquid flow into and out of the upper chamber. Gas is bled from the upper chamber.

11 Claims, 4 Drawing Figures

GAS/LIQUID SEPARATOR

This invention concerns air and oil separators and, more particularly, a separator for use on aircraft which will keep a hydraulic system substantially totally free of entrained air.

A large number of hydraulic power losses occur in aircraft hydraulic systems because of air entrained in the systems. These losses primarily occur during negative "g" flight, during engine start up at cold temperatures, and immediately following the operation of a large differential area actuator. Most of this type of power loss can be attributed to the lack of an adequate pump suction pressure, and can occur during engine start up after a cold soak and also following the operation of the large differential area actuator when accompanied by a hydraulic or other flight control activity. When a system contains large bubbles of free, i.e. entrained, air all three conditions increase the possibilities for pump air lock.

Although the most direct method of preventing the occurrence of entrained air is to preclude its entry after the system has been properly bled, air can nevertheless enter a system after bleeding under several conditions some of which are replacement of components, engine shut down under cold ambient conditions, operating one flight control system while the other is not pressurized, and servicing a system with fluid having a high air content. With proper equipment and using proper precautions, air entering the system during the last two events can be held to a very minimal amount. However, in the first two events listed the system must be bled after the occurrence of either event to be sure that any which may have entered the system has been removed. In any event, extraordinary efforts are required to keep hydraulic systems totally free of entrained air.

Prior art systems for removing such entrained air have been found to perform adequately under most circumstances, however, no device is known which is adaptable to aircraft hydraulic systems which require a large capacity pump having stringent flow rates and operating pressure parameters. The present invention provides a system which not only effectively removes entrained air but also prohibits pump air lock.

Accordingly, an object of the present invention is to provide an air separator for use on aircraft which will maintain aircraft hydraulic systems substantially totally free of entrained air.

Another object of this invention is to provide an air separator for use in aircraft hydraulic and other systems which contain relatively large bubbles among smaller sizes and is effective during negative "g" flight, engine start up at cold temperatures, and immediately following the operation of a large differential area actuator.

A further object of this invention is to provide an air separator which removes substantially all air entrained in oil systems and also prohibits pump air lock.

Other objects, advantages and novel features of the invention will become apparent when considered in conjunction with the accompanying drawings in which like numerals represent like parts throughout and wherein.

The present invention, in general, separates entrained air from the oil in a hydraulic system by forcing the bubbles toward the center of a holding chamber through centrifugal force, discharging air-free oil from the periphery of the chamber, directing oil with air entrained therein centrally into an upper chamber where further separation occurs, and combining air-free oil from the upper chamber and from the initial chamber into a common discharge outlet. The air collected in the upper chamber is bled therefrom either continuously or at selected intervals.

Figure 1:
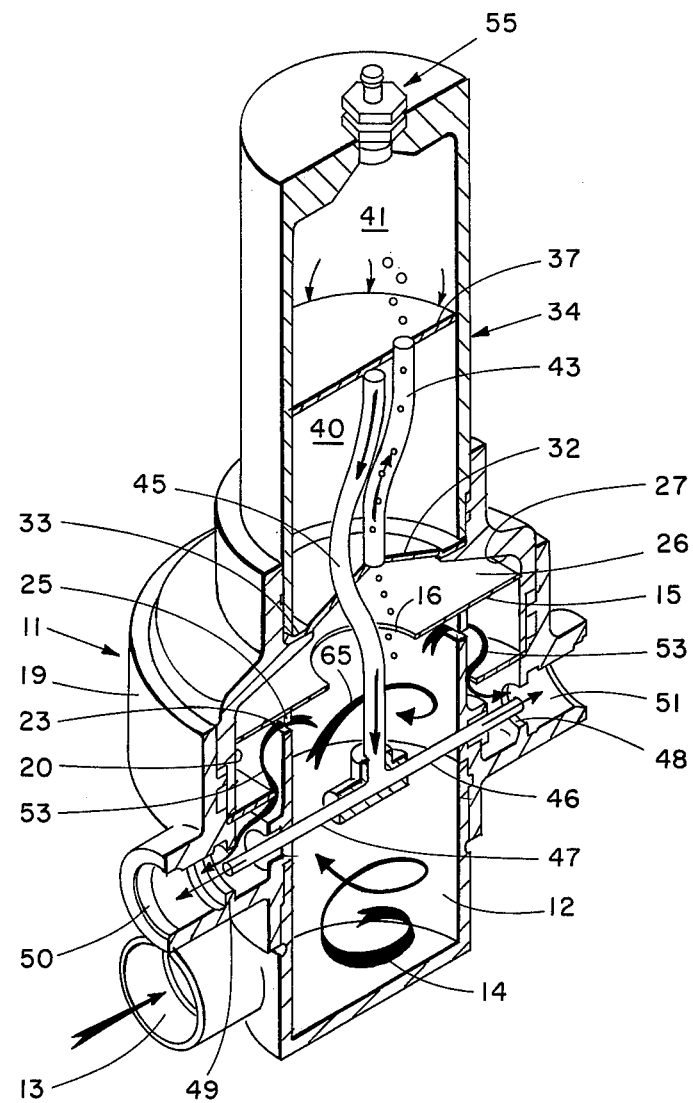
FIG. 1 is a sectional perspective view of one embodiment of the invention.

Referring to the drawings, the perspective view of FIG. 1 shows an air separator 11 having in the lower portion an oil receiving preferably cylindrical chamber 12 into which hydraulic system oil is introduced through an inlet 13 along the periphery of chamber 12 so as to provide a tangential flow of fluid around the chamber as indicated by arrow 14. Chamber 12 extends longitudinally to a circumferential plate 15 which is provided with a central opening 16 to permit selected egress of oil with entrained air bubbles. Air separator 11 has an enlarged central portion 19 within which is formed an annular chamber 20 surrounding the upper portion of receiving chamber 12 and in which are positioned a plurality of baffles, not shown in this view, disposed to change circular motion of the fluid to radial motion. Access to chamber 20 is provided via a circumferential slot 23 which is formed between the upper end of the chamber 12 cylinder and the bottom of a circumferential ring 25 which is secured by welding or other means to plate 15. Above plate 15, a conical chamber 26 terminates in a circumferential wall 27 formed in the separator.

Mounted above chamber 26 is a centrally positioned funnel 32 which is secured preferably by welding to a circumferential plate 33 in an upper separator cylinder 34. Cylinder 34 is divided into two chambers by a plate 37, with plate 37 spaced slightly from the walls of cylinder 34 to provide communication between a lower chamber 40 and an upper chamber 41 thereof. An air and oil inlet tube 43 is affixed in sealed relationship to funnel 32 preferably by welding and terminates in an off-center position in plate 37. Tube 43 and plate 37 are also affixed in the same manner to provide support for plate 37. Plate 37 may also be attached at selected points around its circumference to cylinder 34 for additional support. Chamber 40 collects oil flowing from chamber 41 and allows for further settling out of entrained air before the fluid therein reaches the top of an outlet tube 45 selectively centrally spaced from plate 37. Fluid flows through either branch 46 or 47 of tube 45 and exits through orifices 48 and 49 positioned in respective separator outlets 50 and 51. Chamber 41 terminates in a bleed valve assembly 55 positioned at the uppermost end thereof.

Figure 2:
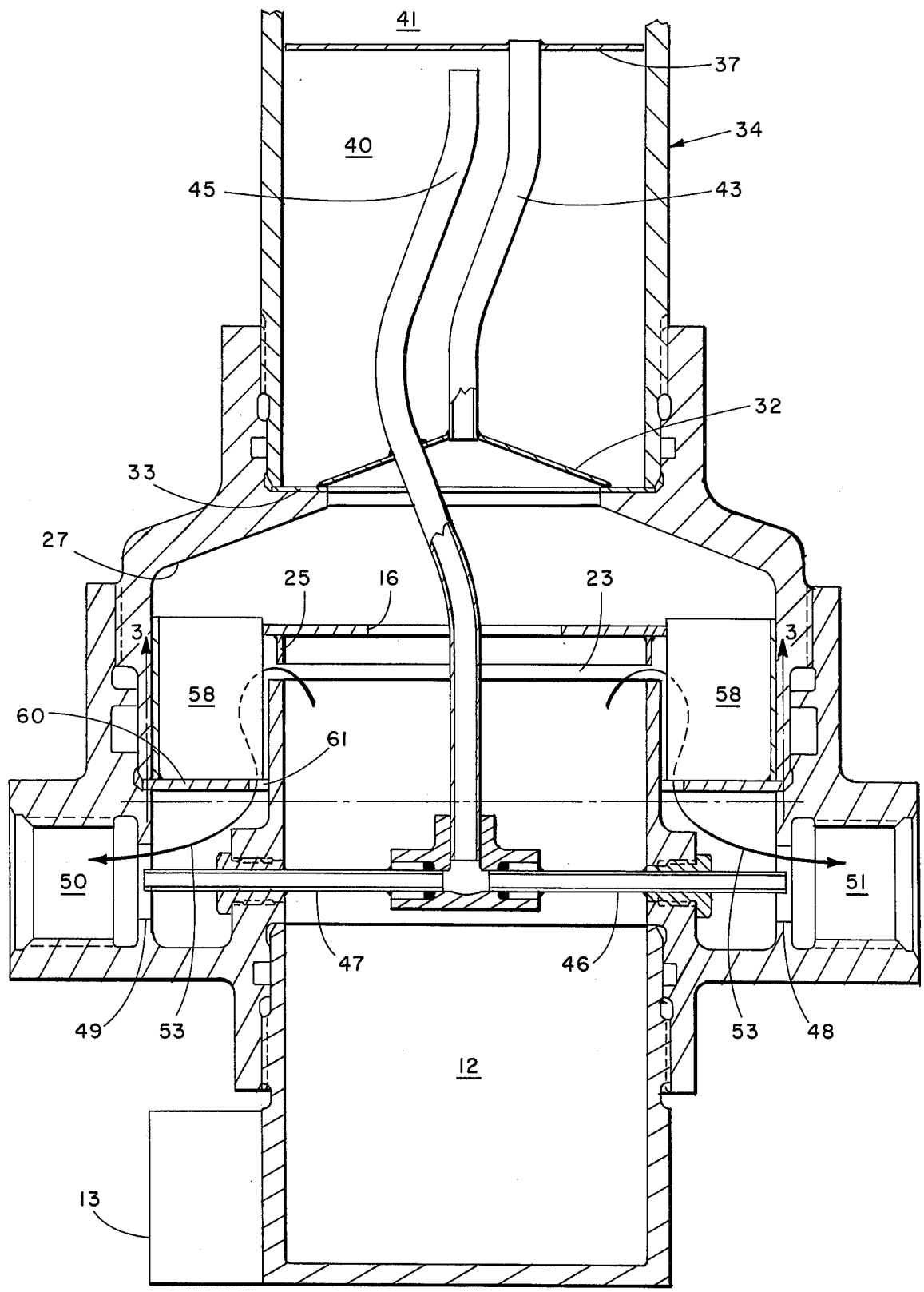
FIG. 2 is an enlarged front elevation of the operative components of the embodiment of FIG. 1.
Figure 3:
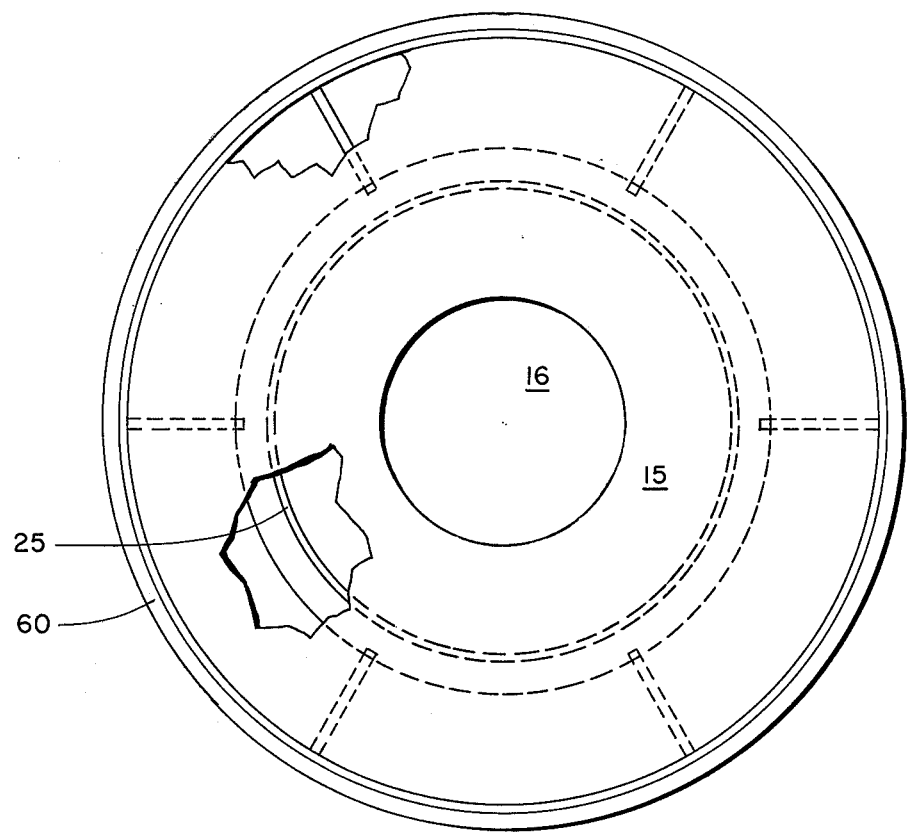
FIG. 3 is a plan view of the baffle assembly of FIG. 2 taken along a line substantially corresponding to line 3—3 therein.
Figure 4:
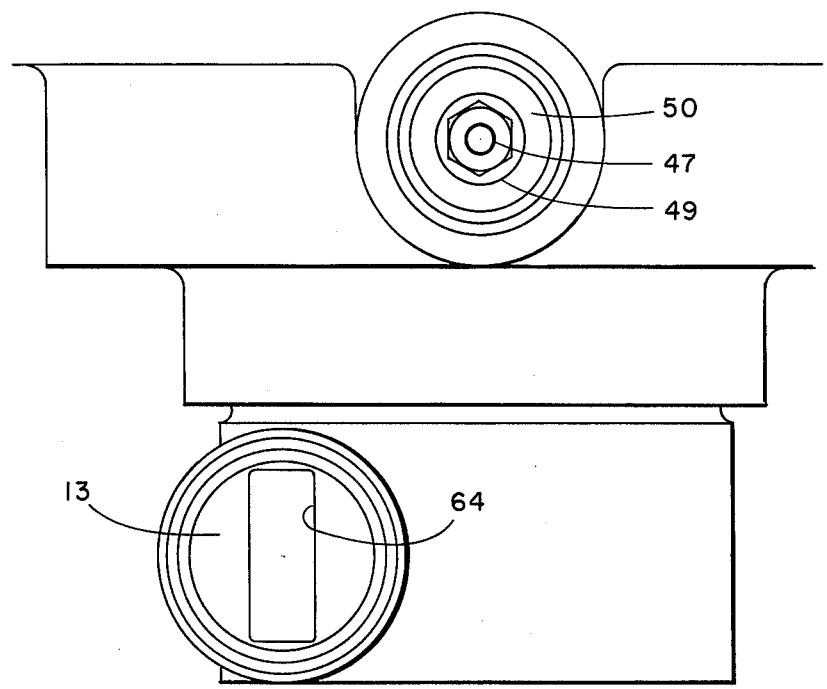
FIG. 4 is a front elevation of the air separator of FIG. 1 illustrating the position of the inlet and outlet passages therein.

FIG. 2 is an enlarged view of substantially the entire air separator and shows the position of baffles 58 in chamber 20 as well as a clearer view of the positions and shapes of the inlet and outlet tubes 43 and 45, respectively. FIG. 3 is a sectional view of the baffle assembly which includes a baffle-supporting annular plate 60 which is spaced from the outer wall of chamber 12 as indicated at 61 to permit egress of fluid via slot 23 to outlets 50 and 51 as indicated by arrows 53. FIG. 4 is a front elevation of separator 11 and illustrates one form of configuration of a restriction in inlet 13 such as a rectangular opening 64 to act as a choke and force the fluid into a circular motion about chamber 12.

The perspective view of FIG. 1 illustrates the components as well as the operation of the device. The oil having entrained air is forced into inlet 13 through slot 64 which produces a swirling motion in chamber 12 and indicated by arrows 14 and 65. The swirling motion creates a centrifugal force action on the oil and air mixture which force causes the heavier, air-free, oil to move to the outer walls of the chamber and leaves the lighter oil having entrained air in the central portion of the chamber. Air-free oil is forced out of chamber 12 through slot 23 as indicated by arrows 53. Oil still having air entrained flows through opening 16 into chamber 26 from which chamber it is diverted by funnel 32 into tube 43 and thereafter into upper chamber 41 of cylinder 34. The entrained air collects in the upper area of chamber 41 and is vented through vent 55. The oil in chamber 41 is forced to the perimeter thereof by plate 37 and will have all or substantially all of its entrained air removed by the time it flows downward past the edge of the plate 37 into chamber 40. Tube 45 conducts the oil from chamber 40 to tubes 46 and 47 and thence to outlets 50 and 51.

There is thus provided an air separator which combines the use of centrifugal force to cause bubbles to collect toward the center of the initial chamber of the device and a vented air chamber in the upper portion of the device from which substantially completely air-free oil flows downward to the outlet while bubbles rise and are vented. The initial chamber is in effect a centrifuge the entrance to which is choked to increase fluid velocity. The choked entrance at the periphery of the chamber forces the air-contaminated oil into a circular motion or vortex which motion is carried to an upper portion of the chamber where initial separation of air-free oil and air-contaminated oil occurs. A lid, plate 15, at the top of this chamber allows oil in the center thereof to be forced upward through a central opening into a second chamber from where it enters an inverted funnel and then proceeds upward through an internal tube into an air settling chamber. The height of plate 15 above the inlet to the separator is selected so as to sustain a classical centrifugal vortex at the minimum fluid velocity through opening 64. Heavier oil, i.e. oil with no air entrained therein, is permitted to escape from the receiving chamber via a circumferential slot while the less dense oil containing bubbles passes up through the funnel and outlet tube.

Upon entering the air-holding or air-settling chamber above plate 37, the velocity of the oil, is reduced and the bubbles are free to "settle" from the oil and remain in chamber 41 as the oil exits chamber 41 into chamber 40 around the periphery of plate 37 and enters tube 45, and thence tubes 46 and 47. To assist the bubbles in moving into chamber 41 a circulation into and out thereof is caused by the aspiration effect created by the placement of tubes 46 and 47 in orifices 48 and 49, respectively. The more dense oil from chamber 12 flows into outlets 50 and 51 via slots 23 and 61 and orifices 48 and 49 causing the fluid pressure in outlets 50 and 51 to be lower than that of chamber 12. With the tubes 46 and 47 centrally disposed within orifices 48 and 49, respectively, the fluid pressure in chamber 40 and 41 is thus also lower than that of chamber 12 causing the circulation into and out of chamber 41.

The restriction to fluid flow caused by orifices 48 and 49 increases the velocity and thus the momentum of the fluid as it flows through these orifices. This increased momentum past the ends of tubes 46 and 47 being centrally disposed within orifices 48 and 49, respectively, further enhances the circulation into and out of chamber 41. Orifices 48 and 49 can be replaced by venturi tubes where space permits and where the fluid pressure drop through the separator must be minimized. The same circulation into and out of chamber 41 can be achieved using venturi constrictions rather than orifices with a smaller pressure drop between chamber 12 and outlets 50 and 51. The upper end of tube 45 is centrally positioned in cylinder 34, both axially and radially, so that when the separator assumes any attitude or is under any condition of acceleration the inlet of tube 45 will remain covered with fluid and not air. Plate 37 is placed immediately above the end of tube 45 to provide for maximum settling out of any remaining entrained air before the oil in chamber 40 enters tube 45. That is, plate 37 forces the residual fluid and the bubbles entrained therein to the periphery of chamber 41 before this volume of fluid enters chamber 40 and ultimately tube 45, allowing more time for the entrained air bubbles to settle out of the fluid. Chambers 40 and 41 remain full of fluid until the separated air displaces an equal amount of fluid in chamber 41. The flow rates through tubes 43 and 45 are selected such that the flow into chamber 41 is greater than the maximum expected rate of entrained air flow into the separator. Tubes 45 and 46 may be located other than as shown so long as the end of tube 45 is spaced from plate 37 in the manner shown and the ends of tubes 46 and 47 terminate in outlets 48 and 49 as shown.

Where the separator is installed in aircraft hydraulic systems, such systems must be bled wherever air may be trapped therein and would have a deleterious effect on the system. If there is no place in the system where air can be trapped, the system may be bled at vent 55 provided that all of the actuators are cycled sufficiently so that all of the fluid in the system passes through the separator at least once. That is, the separator should be so placed in such systems that all of the fluid must be passed through it before going to the pump.

It will be appreciated that the invention is not limited to air/oil separation but may be applied in the separation of many other gases from liquids. Also, the separator may be configured to have only one outlet so that only one outlet tube such as 46 or 47 would be required. Although various components are either welded together or threaded together as indicated in FIG. 2, it will be appreciated that these components may be joined in other fashion within the concept of the invention.

Obviously, many modifications and variations of the present invention are possible in the light of the foregoing teachings.

What is claimed is:

1. A method of separating liquid from gas bubbles entrained therein comprising:
   creating a vortex of said liquid so that more dense substantially bubble-free liquid will collect in the periphery thereof and less dense bubble-containing liquid will collect in the center thereof, said step of creating a vortex including initially directing liquid tangentially into a circular chamber;

recovering said more dense liquid by peripheral discharge and collecting said less dense liquid by aspiration effect from said vortex, said step of recovering more dense liquid including changing circular flow of exiting liquid into radial flow thereof, said step of collecting less dense liquid including discharging said less dense liquid symmetrically within the discharge of said more dense liquid to create said aspiration effect;

venting the bubbles from said collected liquid;

combining said liquid recovered by peripheral discharge and said collected liquid in an outlet flow arranged so as to create said aspiration effect; and additionally removing bubbles from said less dense liquid by discharge thereof into a first volume and collecting the liquid in a second volume by peripheral settling from said first volume, said step of recovering more dense liquid further including additionally baffling said peripherally discharged liquid so as to form radially outward movement thereof prior to said liquid entering the outlet of the separating device.

2. A gas and liquid separator for separating entrained gases from a liquid such as hydraulic fluid under extreme starting and operating conditions comprising:

a container having an inlet chamber and inlet means for directing liquid entering said chamber around the circumference thereof so as to produce a swirling motion therein thereby creating a centrifugal force action which causes heavier liquid to move to the wall of the chamber and liquid having gas entrained therein to be forced toward the center of the chamber so as to create a vortex in the liquid directed thereinto;

a separating chamber contiguous to said inlet chamber for initially separating larger gas bubbles from said liquid;

an annular chamber disposed about said separating chamber and a circumferential slot in said separating chamber permitting overflow of more dense liquid into said annular chamber so that the more dense substantially gas-free liquid may be discharged therefrom;

a settling chamber remote from said separating chamber and means for directing the liquid not discharged from said separating chamber and containing smaller gas bubbles into said settling chamber;

vent means connected to said settling chamber for venting gas therefrom, said settling chamber partitioned into at least upper and lower communicating volumes;

means for collecting and conveying liquid not discharged from said separating chamber through said lower volume to said upper volume;

means including a baffle permitting peripheral settling of liquid from said upper volume to said lower volume for centrally concentrating said not discharged liquid;

conduit means for centrally discharging liquid from said lower volume at a position adjacent said means permitting peripheral settling;

means for combining liquid discharged from said separating chamber and said lower volume so as to augment flow of liquid through said separator, said combining means including a restricted outlet in said container and said annular chamber communicating with and discharging liquid into said restricted outlet in such a relation to the discharge of liquid thereinto from said volume as to create an aspiration effect inducing circulation into and out of said upper volume; and radially disposed baffles in said annular chamber for changing circular flow of liquid to radial flow thereof.

3. The separator as defined in claim 2 wherein the inlet to said conduit means is centered in said lower volume and the outlet of said conduit means is symmetrically disposed within said restricted outlet.

4. The separator as defined in claim 3 wherein the outlet to said conduit means is bifurcated into oppositely disposed branches and said container is provided with dual outlets for accommodating respective restricted outlets.

5. A system for removing entrained gases from a liquid such as hydraulic fluid comprising:

a multi-chamber separator having a cylindrical inlet chamber;

means in the lower portion of said chamber for creating a vortex in liquid directed thereinto and means in the upper portion thereof for permitting the peripheral discharge therefrom of more dense substantially gas-free liquid;

outlet means in said separator and means for receiving said more dense liquid and distributing said liquid to said outlet means;

a first chamber adjacent to and communicating with said inlet chamber for collecting less dense liquid not discharged therefrom;

a settling chamber remote from said first chamber for receiving said less dense liquid and first conduit means connecting said settling and first chambers;

vent means connected to said settling chamber for venting gases entrained in said less dense liquid;

a second chamber intermediate said first and settling chambers for receiving liquid from said settling chamber, and second conduit means connecting said second chamber and said outlet means, said first chamber having a conically shaped dome which is connected to said first conduit means for directing less dense liquid thereinto;

chamber separating means secured to said first conduit means adjacent the outlet thereof for separating said settling chamber and said second chamber, said separating means spaced from said chamber walls so as to permit selected peripheral flow of liquid from said settling chamber to said second chamber, said second conduit means centrally positioned with respect to said separating means and adjacent thereto for further delaying liquid admitted into said second conduit means so as to permit additional gas separation; and means for discharging liquid from said second conduit means centrally within liquid discharged from said means permitting peripheral discharge of said more dense liquid, said means permitting peripheral discharge including an annular chamber disposed about the upper portion of said inlet chamber and a circumferential slot permitting flow of more dense liquid into said annular chamber, said annular chamber having baffles for changing circular flow of liquid into radial flow thereof and for directing liquid radially outward into said outlet means.

6. A gas and liquid separator for separating entrained gases from a liquid such as hydraulic fluid under extreme starting and operating conditions comprising:

a container having an inlet chamber for creating a vortex in liquid directed thereinto and a cylindrical separating chamber contiguous to said inlet chamber for initially separating larger gas bubbles from said liquid;

an annular chamber disposed about said separating chamber and a circumferential slot in said separating chamber permitting overflow of more dense liquid into said annular chamber so that the more dense substantially gas-free liquid may be discharged therefrom;

a cylindrical settling chamber coextensive with and remote from said separating chamber and means for directing the liquid not discharged from said separating chamber and containing smaller gas bubbles into said settling chamber;

vent means connected to said settling chamber for venting gas therefrom, said settling chamber partitioned into at least upper and lower communicating volumes;

means for collecting and conveying liquid not discharged from said separating chamber through said lower volume to said upper volume;

a baffle permitting only peripheral settling of liquid from said upper volume to said lower volume;

conduit means for centrally discharging liquid from said lower volume at a position adjacent said baffle; and means for combining liquid discharged from said separating chamber and said lower volume so as to augment flow of liquid through said separator.

7. The separator as defined in claim 6 and further including a restricted outlet in said container;

said annular chamber communicating with said outlet and discharging liquid circumferentially with respect to the discharge of liquid from said lower volume as to create an aspiration effect inducing circulation into and out of said upper volume.

8. The separator as defined in claim 7 and further including radially disposed baffles in said annular chamber for changing circular flow of liquid to radial flow thereof.

9. A system for removing entrained gases from a liquid such as hydraulic fluid comprising:

a multi-chamber separator having a cylindrical inlet chamber;

means in the lower portion of said chamber for creating a vortex in liquid directed thereinto and means in the upper portion thereof for permitting the peripheral discharge therefrom of more dense substantially gas-free liquid;

outlet means in said separator and means for receiving said more dense liquid and distributing said liquid to said outlet means;

a first chamber adjacent to and communicating with said inlet chamber for collecting less dense liquid not discharged therefrom;

a cylindrical settling chamber remote from said first chamber for receiving said less dense liquid and first conduit means connecting said settling and first chambers;

vent means connected to said settling chamber for venting gases entrained in said less dense liquid;

a second chamber intermediate said first and settling chambers and having a common side wall therewith for receiving liquid from said settling chamber, and second conduit means connecting said second chamber and said outlet means, said first chamber having a conically shaped dome which is connected to said first conduit means for directing less dense liquid thereinto;

chamber separating means secured to said first conduit means adjacent the outlet thereof for separating said settling chamber and said second chamber, said separating means circular and spaced from said common side wall so as to permit selected peripheral flow of liquid from said settling chamber to said second chamber; and means for discharging liquid from said second conduit means centrally within liquid discharged from said means permitting peripheral discharge of said more dense liquid to create an aspiration effect inducing circulation into and out of said settling chamber.

10. The system as defined in claim 9 wherein said second conduit means is centrally positioned with respect to said separating means and adjacent thereto for further delaying liquid admitted into said second conduit means so as to permit additional gas separation, said means permitting peripheral discharge from said inlet chamber including an annular chamber disposed about the upper portion of said inlet chamber and a circumferential slot permitting flow of more dense liquid into said annular chamber.

11. The system as defined in claim 10 wherein said annular chamber includes baffles changing circular flow of liquid into radial flow thereof and for directing liquid radially outward into said outlet means.

* * * * *